US010372554B1

(12) United States Patent
Natanzon et al.

(10) Patent No.: US 10,372,554 B1
(45) Date of Patent: Aug. 6, 2019

(54) VERIFICATION AND RESTORE OF REPLICATED DATA USING A CLOUD STORING CHUNKS OF DATA AND A PLURALITY OF HASHES

(71) Applicant: EMC Corporation, Hopkinton, MA (US)

(72) Inventors: Assaf Natanzon, Tel Aviv (IL); Eran Weiss, Givataim (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 5 days.

(21) Appl. No.: 14/143,825

(22) Filed: Dec. 30, 2013

(51) Int. Cl.

| | |
|---|---|
| ***G06F 3/06*** | (2006.01) |
| ***G06F 12/16*** | (2006.01) |
| ***G06F 11/00*** | (2006.01) |
| ***G06F 11/14*** | (2006.01) |

(52) U.S. Cl.

CPC ........ *G06F 11/1469* (2013.01); *G06F 3/0604* (2013.01); *G06F 3/065* (2013.01); *G06F 3/067* (2013.01); *G06F 11/1464* (2013.01)

(58) Field of Classification Search

CPC ............. G06F 11/1451; G06F 11/1448; G06F 11/1464; G06F 3/065; G06F 3/067; G06F 3/0604; G06F 3/0608; G06F 11/1469

See application file for complete search history.

(56) References Cited

U.S. PATENT DOCUMENTS

| | | | | |
|---|---|---|---|---|
| 7,516,287 | B2 * | 4/2009 | Ahal | G06F 11/1471 711/162 |
| 8,332,687 | B1 * | 12/2012 | Natanzon | G06F 11/1471 709/202 |
| 8,341,115 | B1 * | 12/2012 | Natanzon | G06F 11/1471 707/613 |
| 8,725,691 | B1 * | 5/2014 | Natanzon | G06F 11/2074 707/640 |
| 8,954,673 | B1 * | 2/2015 | Natanzon | G06F 12/1018 711/118 |
| 9,003,138 | B1 * | 4/2015 | Natanzon | G06F 11/14 707/634 |
| 9,563,517 | B1 * | 2/2017 | Natanzon | G06F 11/1464 |
| 9,852,151 | B1 * | 12/2017 | Youngworth | G06F 3/0689 |
| 2004/0181687 | A1 * | 9/2004 | Nachenberg | G06F 21/567 726/30 |

(Continued)

*Primary Examiner* — Glenn Gossage

(74) *Attorney, Agent, or Firm* — Krishnendu Gupta; David Kuznick

(57) ABSTRACT

A computer implemented method, system, and computer program product for data replication and restoration. The method includes downloading a plurality of hashes from a cloud corresponding to a set of backed up hashes for a set of chunks, wherein each chunk corresponds to a portion of a LUN at a production site at a point in time, determining a second plurality of hashes for the LUN at the production site, and comparing each of the second plurality of hashes for the LUN at the production site with the plurality of hashes downloaded from the cloud. The method further includes downloading data corresponding to one or more non-matching hashes from the cloud, and restoring the data that was downloaded to the LUN on the production site. Once the LUN has been validated, interception of IOs by a splitter may be stopped.

18 Claims, 17 Drawing Sheets

(56) References Cited

U.S. PATENT DOCUMENTS

| | | | | | |
|---|---|---|---|---|---|
| 2010/0318759 | A1* | 12/2010 | Hamilton | G06F 11/1451 | 711/171 |
| 2011/0167221 | A1* | 7/2011 | Pangal | G06F 11/1453 | 711/117 |
| 2014/0201153 | A1* | 7/2014 | Vijayan | G06F 11/1451 | 707/647 |
| 2015/0012709 | A1* | 1/2015 | Lad | G06F 11/1464 | 711/126 |

* cited by examiner

VERIFICATION AND RESTORE OF REPLICATED DATA USING A CLOUD STORING CHUNKS OF DATA AND A PLURALITY OF HASHES

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

RELATED APPLICATION

This Application is related to U.S. patent application Ser. No. 14/143,778 entitled "CLOUD SNAPSHOTS", now U.S. Pat. No. 9,563,517 filed on Dec. 30, 2013, the contents and teachings of which are incorporated herein by reference in their entirety.

TECHNICAL FIELD

This invention relates to data replication.

BACKGROUND

Computer data is vital to today's organizations, and a significant part of protection against disasters is focused on data protection. As solid-state memory has advanced to the point where cost of memory has become a relatively insignificant factor, organizations can afford to operate with systems that store and process terabytes of data.

Conventional data protection systems include tape backup drives, for storing organizational production site data on a periodic basis. Such systems suffer from several drawbacks. First, they require a system shutdown during backup, since the data being backed up cannot be used during the backup operation. Second, they limit the points in time to which the production site can recover. For example, if data is backed up on a daily basis, there may be several hours of lost data in the event of a disaster. Third, the data recovery process itself takes a long time.

Another conventional data protection system uses data replication, by creating a copy of the organization's production site data on a secondary backup storage system, and updating the backup with changes. The backup storage system may be situated in the same physical location as the production storage system, or in a physically remote location. Data replication systems generally operate either at the application level, at the file system level, at the hypervisor level or at the data block level.

Current data protection systems try to provide continuous data protection, which enables the organization to roll back to any specified point in time within a recent history. Continuous data protection systems aim to satisfy two conflicting objectives, as best as possible; namely, (i) minimize the down time, in which the organization production site data is unavailable, during a recovery, and (ii) enable recovery as close as possible to any specified point in time within a recent history.

Continuous data protection typically uses a technology referred to as "journaling," whereby a log is kept of changes made to the backup storage. During a recovery, the journal entries serve as successive "undo" information, enabling rollback of the backup storage to previous points in time. Journaling was first implemented in database systems, and was later extended to broader data protection.

One challenge to continuous data protection is the ability of a backup site to keep pace with the data transactions of a production site, without slowing down the production site. The overhead of journaling inherently requires several data transactions at the backup site for each data transaction at the production site. As such, when data transactions occur at a high rate at the production site, the backup site may not be able to finish backing up one data transaction before the next production site data transaction occurs. If the production site is not forced to slow down, then necessarily a backlog of un-logged data transactions may build up at the backup site. Without being able to satisfactorily adapt dynamically to changing data transaction rates, a continuous data protection system chokes and eventually forces the production site to shut down.

SUMMARY

A computer implemented method, system, and computer program product for restoring a LUN production site comprising downloading a plurality of hashes from a cloud corresponding to a set of backed up hashes for a set of chunks, wherein each chunk corresponds to a piece of the LUN at a point in time, determining a plurality of hashes for the LUN on the production site, and comparing each of the plurality of hashes for the LUN with the plurality of hashes from the cloud; wherein if the corresponding hashes do not match, downloading data corresponding to the non-corresponding hashes from the cloud via the corresponding chunk and restoring the data to the LUN on the production site.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every Figure. The drawings are not necessarily to scale, emphasis instead being placed upon illustrating embodiments, principles, and concepts. Thus, features and advantages of the present disclosure will become more apparent from the following detailed description of exemplary embodiments thereof taken in conjunction with the accompanying drawings in which:

DETAILED DESCRIPTION

Figure 1:
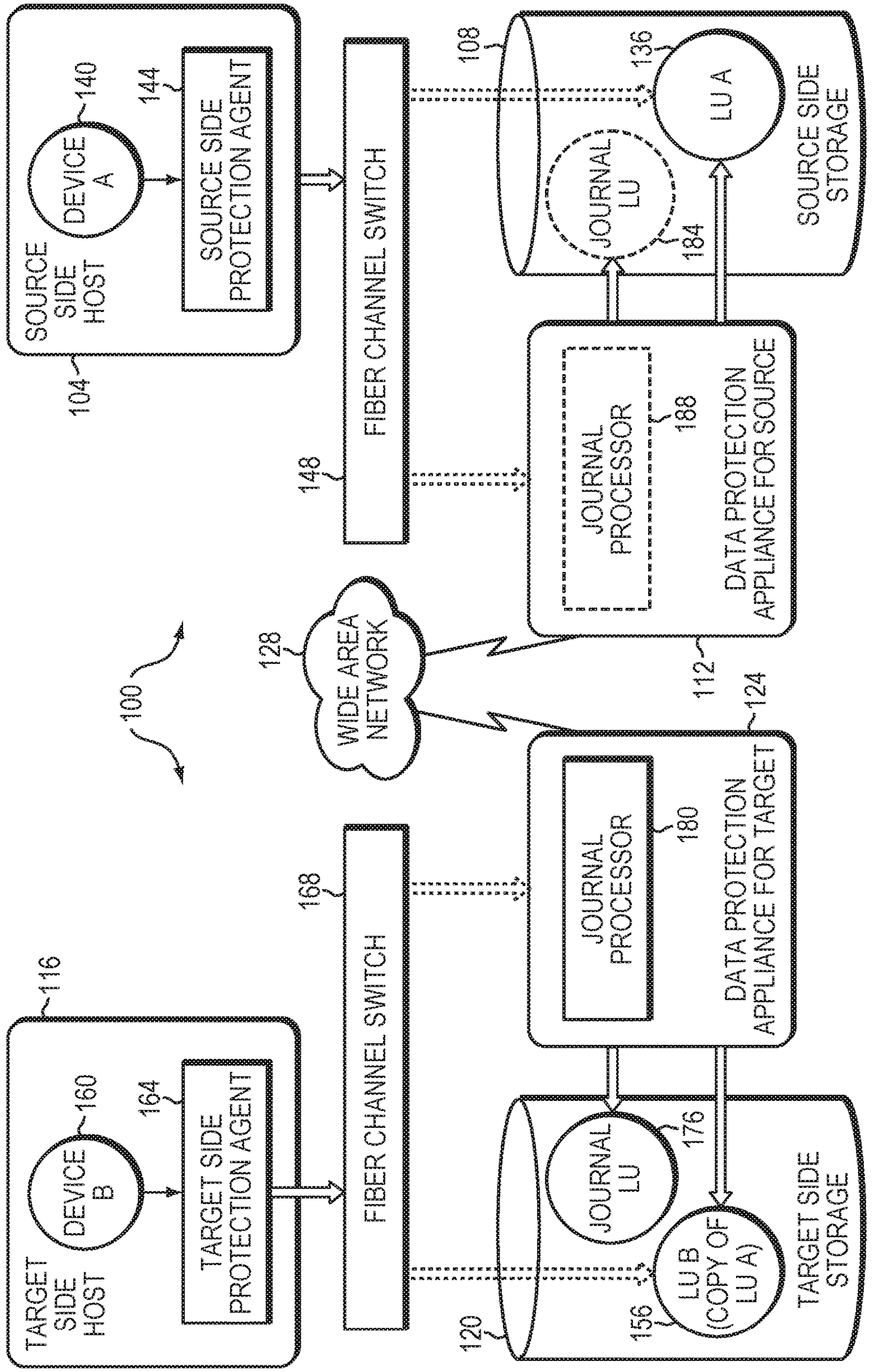
FIG. 1 is a simplified illustration of a data protection system, in accordance with an embodiment of the present disclosure.

In certain embodiments, the embodiments disclosed herein may enable storing of a snapshot into object based storage. Generally, object based storage and cloud object based storage, such as services like EMC Atmos and Amazon S3, may provide inexpensive storage, but such storage may have limited features and capabilities. Usually, in object based storage, it may be possible to create, read, and delete an object, but there may be no way to modify an object. Typically, object based stores may not allow storage of traditional snapshots in the object store. Generally, a full logical unit (LU) may not be stored as a single object as there is no ability to modify it. Usually, to update an object in object base storage, the whole object would need to be re-created. Conventionally, a LU may not be broken into an infinite number of building blocks, as this may require an object stored for each individual block and the overhead of creating and holding so many objects may be too high to reasonably manage.

In certain embodiments, the current invention may enable a change in the format of block data to enable it to be stored in object storage. In certain embodiments, a LU may be broken up into objects. In certain embodiments, the objects may range in size between 1 MB-10 MB. In some embodiments, it may be efficient to manage snapshots at a 1 MB-10 MB granularity. In other embodiments, it may be more efficient to manage a snapshot at a granularity the array uses. In some embodiments, if a 65 k block changed within a block of 1 MB, creating snapshots with 1 MB granularity may require sending 1 MB of data to the cloud. In at least one embodiment, this may be because there may not be a way to modify a stored object. In most embodiments, the blocks may be encrypted and sent into the cloud. In at least some embodiments, metadata describing the blocks may be sent to be stored in the cloud. In certain embodiments, metadata describing the blocks may also include a SHA-1 (Secure Hash Algorithm 1) hash signature for the blocks.

In further embodiments, it may be beneficial to keep differential changes to objects corresponding to block that have changed. In certain embodiments, this may enable sending a change of, for example, 64 kb change object instead of 1 MB object to the cloud. In certain embodiments, keeping a block and a differential may require reading the 1 MB and the 64 KB. In one embodiment, two snapshots may consist of a block and a change block. In other embodiments, snapshots referencing difference between snapshots may have pointers to the data in other snapshots. In further embodiments, the current disclosure may enable bi-directional snapshots, which may represent deltas or pointers to future and past snapshots. In other embodiments, the user may designate high importance snapshot that have no dependency on previous snapshots.

In some embodiments, cloud based object storage may provide a replication back-up to a production site. In certain embodiments, as described herein, a replication device may divide a LUN being replicated into a number of objects of different size. In most embodiments, the objects may be encrypted and send to cloud based storage. In at least some embodiments, metadata representing the LUN being replicated may be sent to the cloud. In further embodiments, if the LUN that is being replicated to the cloud becomes corrupted it may be possible to verify or correct the LUN without bringing all the data from the cloud. In certain embodiments, the LUN may be divided into a plurality of pieces corresponding to the object of the cloud. In certain embodiments, a hash may be calculated for each piece of the LUN and compared to a corresponding hash for the piece of the LUN sent to the cloud. In most embodiments, if the hashes are the same, the data is not corrupted. In other embodiments, if the hashes don't match, the data may be corrupted and the replicated object may be restored from the cloud.

In a particular embodiment, a volume may be accessed while it is being recovered from the cloud. In certain embodiments, chunks of data being accessed may be retrieved from the cloud when accessed. In further embodiments, the system may include the activity of each chunk in the production site metadata and the most active chunks may be retrieved first.

In some embodiments, bi-directional delta marking may be used to create snapshots. In a particular embodiment, assume there are objects of 4 blocks. In this particular embodiment, at time T1 the LUN being replicated has a,b,c,d, at time T2, a,e,c,d and at time T3, a,e,f,d. In this embodiment, if there was a full copy of the block at time T1 and time T2, then at time T2 the snapshot may contain pointers to the data of the snapshots at times T1 and T2. In this embodiment, the snapshot may not need to keep any additional data other than metadata describing the snapshot.

In certain embodiments, bidirectional snapshots may allow more important snapshots to have faster recovery. In most embodiments, bidirectional snapshots may have more snapshots with significantly less storage overhead.

In some embodiments, if there is a storage failure, efficient data store from the cloud may be enabled. In many embodiments, when there is a storage failure most of the data in the cloud may identical to the data on the storage array. In certain embodiments, signatures corresponding to portions of the corrupted LUN may be compared to signatures of the data in the cloud. In some embodiments, the signature metadata file may be restored from the cloud. In at least some embodiments, in the background the slices for which the signatures are different than the ones on the storage array may be recovered. In certain embodiments, the recovery may be instantaneous and corrupted data may be determined and recovered when accessed. In most embodiments, corrupted data may be determined by a hash comparison.

The following may be helpful in understanding the specification and claims, although it should be understood that the provided definitions or descriptions are merely exemplary:

BACKUP SITE—a facility where replicated production site data is stored; the backup site is located in a remote site or at the same location as the production site; a backup site may be a virtual or physical site CLONE—a clone is a copy or clone of the image or images, drive or drives of a first location at a second location.

DELTA MARKING STREAM—tracking of the delta between the production and replication site, which may contain the meta data of changed locations, the delta marking stream may be kept persistently on the journal at the production site of the replication, based on the delta marking data the Data Protection Appliance (DPA) knows which locations are different between the production and the replica and transfers them to the replica to make both sites identical.

Data Protection Appliance (DPA)—a Data Protection Appliance a computer or a cluster of computers, or a set of processes that serve as a data protection appliance, responsible for data protection services including inter alia data replication of a storage system, and journaling of I/O requests issued by a host computer to the storage system; The DPA may be a physical device, a virtual device, or may be a combination of a virtual and physical device.

RPA—replication protection appliance, is another name for DPA. An RPA may be a virtual DPA or a physical DPA.

HOST—at least one computer or networks of computers that runs at least one data processing application that issues I/O requests to one or more storage systems; a host is an initiator with a Storage Area Network (SAN); a host may be a virtual machine HOST DEVICE—an internal interface in a host, to a logical storage unit.

IMAGE—a copy of a logical storage unit at a specific point in time.

INITIATOR—a node in a SAN that issues I/O requests.

JOURNAL—a record of write transactions issued to a storage system; used to maintain a duplicate storage system, and to rollback the duplicate storage system to a previous point in time.

LOGICAL UNIT—a logical entity provided by a storage system for accessing data from the storage system.

LUN—a logical unit number for identifying a logical unit; may also refer to one or more virtual disks or virtual LUNs, which may correspond to one or more Virtual Machines. As used herein, LUN and LU may be used interchangeably to refer to a LU.

Management and deployment tools—provide the means to deploy, control and manage the replication protection solution through the virtual environment management tools.

PHYSICAL STORAGE UNIT—a physical entity, such as a disk or an array of disks, for storing data in storage locations that can be accessed by address.

PRODUCTION SITE—a facility where one or more host computers run data processing applications that write data to a storage system and read data from the storage system; may be a virtual or physical site.

SAN—a storage area network of nodes that send and receive I/O and other I/O requests, each node in the network being an initiator or a target, or both an initiator and a target.

SOURCE SIDE—a transmitter of data within a data replication workflow, during normal operation a production site is the source side; and during data recovery a backup site is the source side; may be a virtual or physical site.

SNAPSHOT—a Snapshot refers to differential representations of an image, i.e. the snapshot may have pointers to the original volume, and may point to log volumes for changed locations. Snapshots may be combined into a snapshot array, which may represent different images over a time period.

STORAGE SYSTEM—a SAN entity that provides multiple logical units for access by multiple SAN initiators.

TARGET—a node in a SAN that replies to I/O requests (IOs).

TARGET SIDE—a receiver of data within a data replication workflow; during normal operation a backup site is the target side, and during data recovery a production site is the target side; may be a virtual or physical site; a target site may be referred to herein as a replication site.

WAN—a wide area network that connects local networks and enables the local networks to communicate with one another, such as the Internet.

SPLITTER/PROTECTION AGENT—an agent running either on a production host a switch or a storage array which can intercept IOs and split them to a DPA and to the storage array, fail IOs redirect IOs or do any other manipulation to the IOs; the splitter or protection agent may be used in both physical and virtual systems. The splitter may be in the IOs stack of a system and may be located in the hypervisor for virtual machines. May be referred to herein as an Open Replicator Splitter (ORS).

VIRTUAL VOLUME—a volume which is exposed to host by a virtualization layer, the virtual volume may be spanned across more than one site and or volumes VASA—a set of vCenter providers that allow an administrator to manage storage VMFS—a virtual machine file system, a file system provided by VMware® for storing a virtual machine VMDK—a virtual machine disk file containing a disk data in a VMFS. Analog to a LUN in a block storage array Virtual RPA (vRPA)/Virtual DPA (vDPA)—a DPA running in a VM.

VASA—vSphere Storage application program interfaces (APIs) for Storage Awareness.

MARKING ON SPLITTER—a mode in a splitter where intercepted IOs are not split to an appliance and the storage, but changes (meta data) are tracked in a list and/or a bitmap and I/O is immediately sent to down the IO stack.

FAIL ALL MODE—a mode of a volume in the splitter where all write and read IOs intercepted by the splitter are failed to the host, but other SCSI commands like read capacity are served.

LOGGED ACCESS—an access method provided by the appliance and the splitter, in which the appliance rolls the volumes of the consistency group to the point in time the user requested and lets the host access the volumes in a copy on first write basis.

VIRTUAL ACCESS—an access method provided by the appliance and the splitter, in which the appliance exposes a virtual volume from a specific point in time to the host, the data for the virtual volume is partially stored on the remote copy and partially stored on the journal.

CDP—Continuous Data Protection, refers to a full replica of a volume or a set of volumes along with a journal which allows any point in time access, the CDP copy is at the same site, and may be the same storage array of the production site CRR—Continuous Remote Replica refers to a full replica of a volume or a set of volumes along with a journal which allows any point in time access at a site remote to the production volume and on a separate storage array.

FAST—a fully automated storage tiering used to move active data to higher tiers and less active data to lower tiers.

A description of journaling and some techniques associated with journaling are described in U.S. Pat. No. 7,516,287 titled METHODS AND APPARATUS FOR OPTIMAL JOURNALING FOR CONTINUOUS DATA REPLICATION and U.S. Pat. No. 8,332,687, titled SPLITTER USED IN A CONTINUOUS DATA PROTECTION ENVIRONMENT, which are hereby incorporated by reference. A description of synchronous and asynchronous replication may be described in U.S. Pat. No. 8,341,115 titled DYNAMICALLY SWITCHING BETWEEN SYNCHRONOUS AND ASYNCHRONOUS REPLICATION, which is hereby incorporated by reference.

A discussion of image access may be found in U.S. Pat. No. 8,725,691 titled "DYNAMIC LUN RESIZING IN A REPLICATION ENVIRONMENT" filed on Dec. 16, 2010 which is hereby incorporated by reference.

Description of Embodiments Using of a Five State Journaling Process

Reference is now made to FIG. 1, which is a simplified illustration of a data protection system 100, in accordance with an embodiment of the present invention. Shown in FIG. 1 are two sites; Site I, which is a production site, on the right, and Site II, which is a backup site, on the left. Under normal operation the production site is the source side of system 100, and the backup site is the target side of the system. The backup site is responsible for replicating production site data. Additionally, the backup site enables rollback of Site I data to an earlier point in time, which may be used in the event of data corruption of a disaster, or alternatively in order to view or to access data from an earlier point in time.

During normal operations, the direction of replicate data flow goes from source side to target side. It is possible, however, for a user to reverse the direction of replicate data flow, in which case Site I starts to behave as a target backup site, and Site II starts to behave as a source production site. Such change of replication direction is referred to as a "failover". A failover may be performed in the event of a disaster at the production site, or for other reasons. In some data architectures, Site I or Site II behaves as a production site for a portion of stored data, and behaves simultaneously as a backup site for another portion of stored data. In some data architectures, a portion of stored data is replicated to a backup site, and another portion is not.

The production site and the backup site may be remote from one another, or they may both be situated at a common site, local to one another. Local data protection has the advantage of minimizing data lag between target and source, and remote data protection has the advantage of being robust in the event that a disaster occurs at the source side.

The source and target sides communicate via a wide area network (WAN) 128, although other types of networks are also adaptable for use with the present invention.

In accordance with an embodiment of the present invention, each side of system 100 includes three major components coupled via a storage area network (SAN); namely, (i) a storage system, (ii) a host computer, and (iii) a data protection appliance (DPA). Specifically with reference to FIG. 1, the source side SAN includes a source side host computer 104, a source side storage system 108, and a source DPA 112. Similarly, the target side SAN includes a target side host computer 116, a target side storage system 120, and a target DPA 124.

Generally, a SAN includes one or more devices, referred to as "nodes". A node in a SAN may be an "initiator" or a "target", or both. An initiator node is a device that is able to initiate requests to one or more other devices; and a target node is a device that is able to reply to requests, such as SCSI commands, sent by an initiator node. A SAN may also include network switches, such as fiber channel switches. The communication links between each host computer and its corresponding storage system may be any appropriate medium suitable for data transfer, such as fiber communication channel links.

In an embodiment of the present invention, the host communicates with its corresponding storage system using small computer system interface (SCSI) commands.

System 100 includes source storage system 108 and target storage system 120. Each storage system includes physical storage units for storing data, such as disks or arrays of disks. Typically, storage systems 108 and 120 are target nodes. In order to enable initiators to send requests to storage system 108, storage system 108 exposes one or more logical units (LU) to which commands are issued. Thus, storage systems 108 and 120 are SAN entities that provide multiple logical units for access by multiple SAN initiators.

Logical units are a logical entity provided by a storage system, for accessing data stored in the storage system. A logical unit is identified by a unique logical unit number (LUN). In an embodiment of the present invention, storage system 108 exposes a logical unit 136, designated as LU A, and storage system 120 exposes a logical unit 156, designated as LU B.

In an embodiment of the present invention, LU B is used for replicating LU A. As such, LU B is generated as a copy of LU A. In one embodiment, LU B is configured so that its size is identical to the size of LU A. Thus for LU A, storage system 120 serves as a backup for source side storage system 108. Alternatively, as mentioned hereinabove, some logical units of storage system 120 may be used to back up logical units of storage system 108, and other logical units of storage system 120 may be used for other purposes. Moreover, in certain embodiments of the present invention, there is symmetric replication whereby some logical units of storage system 108 are used for replicating logical units of storage system 120, and other logical units of storage system 120 are used for replicating other logical units of storage system 108.

System 100 includes a source side host computer 104 and a target side host computer 116. A host computer may be one computer, or a plurality of computers, or a network of distributed computers, each computer may include inter alia a conventional CPU, volatile and non-volatile memory, a data bus, an I/O interface, a display interface and a network interface. Generally a host computer runs at least one data processing application, such as a database application and an e-mail server.

Generally, an operating system of a host computer creates a host device for each logical unit exposed by a storage system in the host computer SAN. A host device is a logical entity in a host computer, through which a host computer may access a logical unit. In an embodiment of the present invention, host device 104 identifies LU A and generates a corresponding host device 140, designated as Device A, through which it can access LU A. Similarly, host computer 116 identifies LU B and generates a corresponding device 160, designated as Device B.

In an embodiment of the present invention, in the course of continuous operation, host computer 104 is a SAN initiator that issues I/O requests (write/read operations) through host device 140 to LU A using, for example, SCSI commands. Such requests are generally transmitted to LU A with an address that includes a specific device identifier, an offset within the device, and a data size. Offsets are generally aligned to 512 byte blocks. The average size of a write operation issued by host computer 104 may be, for example, 10 kilobytes (KB); i.e., 20 blocks. For an I/O rate of 50 megabytes (MB) per second, this corresponds to approximately 5,000 write transactions per second.

System 100 includes two data protection appliances, a source side DPA 112 and a target side DPA 124. A DPA performs various data protection services, such as data replication of a storage system, and journaling of I/O requests issued by a host computer to source side storage system data. As explained in detail herein below, when acting as a target side DPA, a DPA may also enable rollback of data to an earlier point in time, and processing of rolled back data at the target site. Each DPA 112 and 124 is a computer that includes inter alia one or more conventional CPUs and internal memory.

For additional safety precaution, each DPA is a cluster of such computers. Use of a cluster ensures that if a DPA computer is down, then the DPA functionality switches over to another computer. The DPA computers within a DPA cluster communicate with one another using at least one communication link suitable for data transfer via fiber channel or IP based protocols, or such other transfer protocol. One computer from the DPA cluster serves as the DPA leader. The DPA cluster leader coordinates between the computers in the cluster, and may also perform other tasks that require coordination between the computers, such as load balancing.

In the architecture illustrated in FIG. 1, DPA 112 and DPA 124 are standalone devices integrated within a SAN. Alternatively, each of DPA 112 and DPA 124 may be integrated into storage system 108 and storage system 120, respectively, or integrated into host computer 104 and host computer 116, respectively. Both DPAs communicate with their respective host computers through communication lines such as fiber channels using, for example, SCSI commands.

In accordance with an embodiment of the present invention, DPAs 112 and 124 are configured to act as initiators in the SAN; i.e., they can issue I/O requests using, for example, SCSI commands, to access logical units on their respective storage systems. DPA 112 and DPA 124 are also configured with the necessary functionality to act as targets; i.e., to reply to I/O requests, such as SCSI commands, issued by other initiators in the SAN, including inter alia their respective host computers 104 and 116. Being target nodes, DPA 112 and DPA 124 may dynamically expose or remove one or more logical units.

As described hereinabove, Site I and Site II may each behave simultaneously as a production site and a backup site for different logical units. As such, DPA 112 and DPA 124 may each behave as a source DPA for some logical units and as a target DPA for other logical units, at the same time.

In accordance with an embodiment of the present invention, host computer 104 and host computer 116 include protection agents 144 and 164, respectively. Protection agents 144 and 164 intercept SCSI commands issued by their respective host computers, via host devices to logical units that are accessible to the host computers. In accordance with an embodiment of the present invention, a data protection agent may act on an intercepted SCSI command issued to a logical unit, in one of the following ways:

Send the SCSI command to its intended logical unit.

Redirect the SCSI command to another logical unit.

Split the SCSI command by sending it first to the respective DPA. After the DPA returns an acknowledgement, send the SCSI command to its intended logical unit.

Fail a SCSI command by returning an error return code.

Delay a SCSI command by not returning an acknowledgement to the respective host computer.

A protection agent may handle different SCSI commands, differently, according to the type of the command. For example, a SCSI command inquiring about the size of a certain logical unit may be sent directly to that logical unit, while a SCSI write command may be split and sent first to a DPA associated with the agent. A protection agent may also change its behavior for handling SCSI commands, for example as a result of an instruction received from the DPA.

Specifically, the behavior of a protection agent for a certain host device generally corresponds to the behavior of its associated DPA with respect to the logical unit of the host device. When a DPA behaves as a source site DPA for a certain logical unit, then during normal course of operation, the associated protection agent splits I/O requests issued by a host computer to the host device corresponding to that logical unit. Similarly, when a DPA behaves as a target device for a certain logical unit, then during normal course of operation, the associated protection agent fails I/O requests issued by host computer to the host device corresponding to that logical unit.

Communication between protection agents and their respective DPAs may use any protocol suitable for data transfer within a SAN, such as fiber channel, or SCSI over fiber channel. The communication may be direct, or via a logical unit exposed by the DPA. In an embodiment of the present invention, protection agents communicate with their respective DPAs by sending SCSI commands over fiber channel.

In an embodiment of the present invention, protection agents 144 and 164 are drivers located in their respective host computers 104 and 116. Alternatively, a protection agent may also be located in a fiber channel switch, or in any other device situated in a data path between a host computer and a storage system.

What follows is a detailed description of system behavior under normal production mode, and under recovery mode.

In accordance with an embodiment of the present invention, in production mode DPA 112 acts as a source site DPA for LU A. Thus, protection agent 144 is configured to act as a source side protection agent; i.e., as a splitter for host device A. Specifically, protection agent 144 replicates SCSI I/O requests. A replicated SCSI I/O request is sent to DPA 112. After receiving an acknowledgement from DPA 124, protection agent 144 then sends the SCSI I/O request to LU A. Only after receiving a second acknowledgement from storage system 108 may host computer 104 initiate another I/O request.

When DPA 112 receives a replicated SCSI write request from data protection agent 144, DPA 112 transmits certain I/O information characterizing the write request, packaged as a "write transaction", over WAN 128 to DPA 124 on the target side, for journaling and for incorporation within target storage system 120.

DPA 112 may send its write transactions to DPA 124 using a variety of modes of transmission, including inter alia (i) a synchronous mode, (ii) an asynchronous mode, and (iii) a snapshot mode. In synchronous mode, DPA 112 sends each write transaction to DPA 124, receives back an acknowledgement from DPA 124, and in turns sends an acknowledgement back to protection agent 144. Protection agent 144 waits until receipt of such acknowledgement before sending the SCSI write request to LU A.

In asynchronous mode, DPA 112 sends an acknowledgement to protection agent 144 upon receipt of each I/O request, before receiving an acknowledgement back from DPA 124.

In snapshot mode, DPA 112 receives several I/O requests and combines them into an aggregate "snapshot" of all write activity performed in the multiple I/O requests, and sends the snapshot to DPA 124, for journaling and for incorporation in target storage system 120. In snapshot mode DPA 112 also sends an acknowledgement to protection agent 144 upon receipt of each I/O request, before receiving an acknowledgement back from DPA 124.

For the sake of clarity, the ensuing discussion assumes that information is transmitted at write-by-write granularity.

While in production mode, DPA 124 receives replicated data of LU A from DPA 112, and performs journaling and writing to storage system 120. When applying write operations to storage system 120, DPA 124 acts as an initiator, and sends SCSI commands to storage LU B.

During a recovery mode, DPA 124 undoes the write transactions in the journal, so as to restore storage system 120 to the state it was at, at an earlier time.

As described hereinabove, in accordance with an embodiment of the present invention, LU B is used as a backup of LU A. As such, during normal production mode, while data written to LU A by host computer 104 is replicated from LU A to LU B, host computer 116 should not be sending I/O requests to LU B. To prevent such I/O requests from being sent, protection agent 164 acts as a target site protection agent for host Device B and fails I/O requests sent from host computer 116 to LU B through host Device B.

In accordance with an embodiment of the present invention, target storage system 120 exposes a logical unit 176, referred to as a "journal LU", for maintaining a history of write transactions made to LU B, referred to as a "journal". Alternatively, journal LU 176 may be striped over several logical units, or may reside within all of or a portion of another logical unit. DPA 124 includes a journal processor 180 for managing the journal.

Journal processor 180 functions generally to manage the journal entries of LU B. Specifically, journal processor 180 (i) enters write transactions received by DPA 124 from DPA 112 into the journal, by writing them into the journal LU, (ii) applies the journal transactions to LU B, and (iii) updates the journal entries in the journal LU with undo information and removes already-applied transactions from the journal. As described below, with reference to FIGS. 2 and 3A-3D, journal entries include four streams, two of which are written when write transactions are entered into the journal, and two of which are written when write transactions are applied and removed from the journal.

Figure 2:
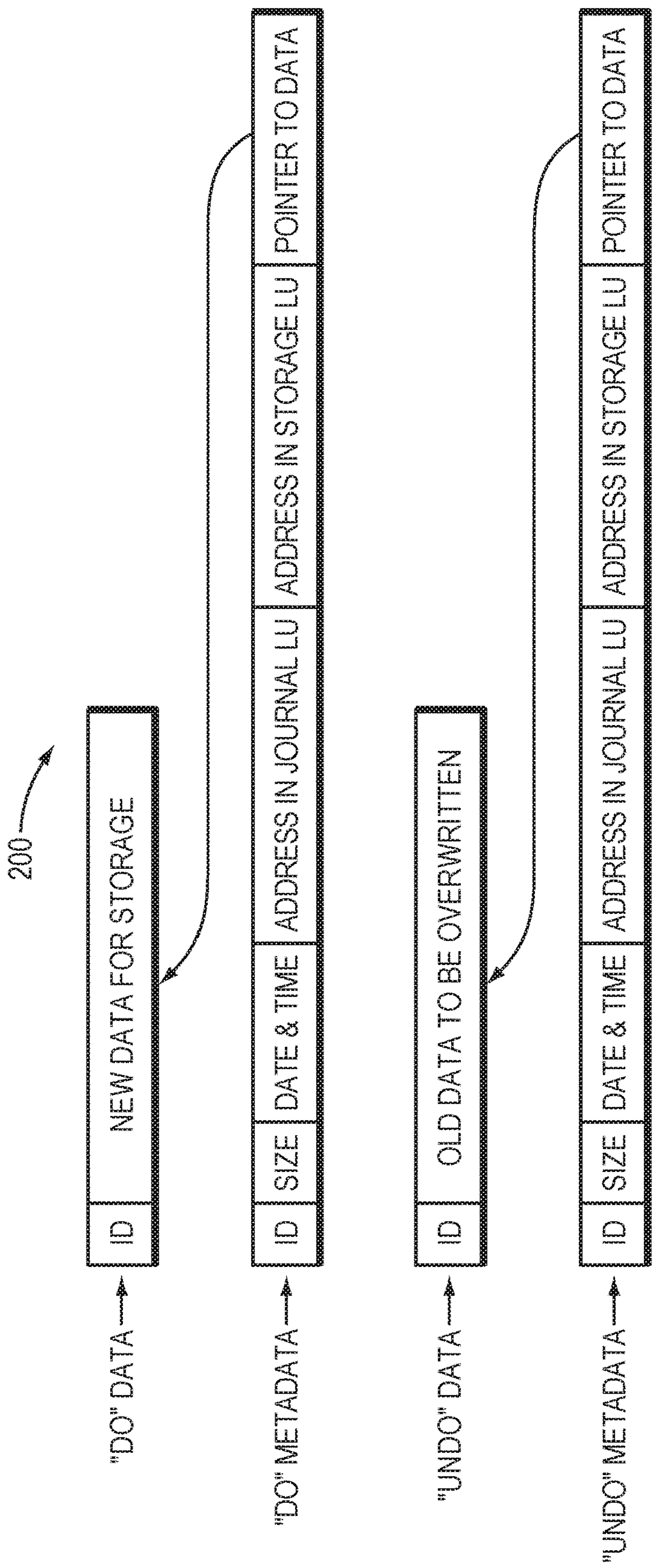
FIG. 2 is a simplified illustration of a write transaction for a journal, in accordance with an embodiment of the present disclosure.

Reference is now made to FIG. 2, which is a simplified illustration of a write transaction 200 for a journal, in accordance with an embodiment of the present invention. The journal may be used to provide an adaptor for access to storage system 120 at the state it was in at any specified point in time. Since the journal contains the "undo" information necessary to rollback storage system 120, data that was stored in specific memory locations at the specified point in time may be obtained by undoing write transactions that occurred subsequent to such point in time.

Write transaction 200 generally includes the following fields:

one or more identifiers;

a time stamp, which is the date & time at which the transaction was received by source side DPA 112;

a write size, which is the size of the data block;

a location or address in journal LU 176 where the data is entered;

a location or address in storage LU B 156 where the data is to be written; and the data itself.

Write transaction 200 is transmitted from source side DPA 112 to target side DPA 124. As shown in FIG. 2, DPA 124 records the write transaction 200 in four streams. A first stream, referred to as a DO stream, includes new data for writing in storage LU B. A second stream, referred to as a DO METADATA stream, includes metadata for the write transaction, such as an identifier, a date & time, a write size, a beginning address in storage LU B for writing the new data in, and a pointer to the offset in the do stream where the corresponding data is located. Similarly, a third stream, referred to as an UNDO stream, includes old data that was overwritten in storage LU B; and a fourth stream, referred to as an UNDO METADATA, includes an identifier, a date & time, a write size, a beginning address in storage LU B where data was to be overwritten, and a pointer to the offset in the undo stream where the corresponding old data is located.

In practice each of the four streams holds a plurality of write transaction data. As write transactions are received dynamically by target DPA 124, they are recorded at the end of the DO stream and the end of the DO METADATA stream, prior to committing the transaction. During transaction application, when the various write transactions are applied to LU B, prior to writing the new DO data into addresses within the storage system, the older data currently located in such addresses is recorded into the UNDO stream.

By recording old data, a journal entry can be used to "undo" a write transaction. To undo a transaction, old data is read from the UNDO stream in a reverse order, from the most recent data to the oldest data, for writing into addresses within LU B. Prior to writing the UNDO data into these addresses, the newer data residing in such addresses is recorded in the DO stream.

The journal LU is partitioned into segments with a pre-defined size, such as 1 MB segments, with each segment identified by a counter. The collection of such segments forms a segment pool for the four journaling streams described hereinabove. Each such stream is structured as an ordered list of segments, into which the stream data is written, and includes two pointers—a beginning pointer that points to the first segment in the list and an end pointer that points to the last segment in the list.

According to a write direction for each stream, write transaction data is appended to the stream either at the end, for a forward direction, or at the beginning, for a backward direction. As each write transaction is received by DPA 124, its size is checked to determine if it can fit within available segments. If not, then one or more segments are chosen from the segment pool and appended to the stream's ordered list of segments.

Thereafter the DO data is written into the DO stream, and the pointer to the appropriate first or last segment is updated. Freeing of segments in the ordered list is performed by simply changing the beginning or the end pointer. Freed segments are returned to the segment pool for re-use.

A journal may be made of any number of streams including less than or more than 5 streams. Often, based on the speed of the journaling and whether the back-up is synchronous or a synchronous a fewer or greater number of streams may be used.

Figure 3:
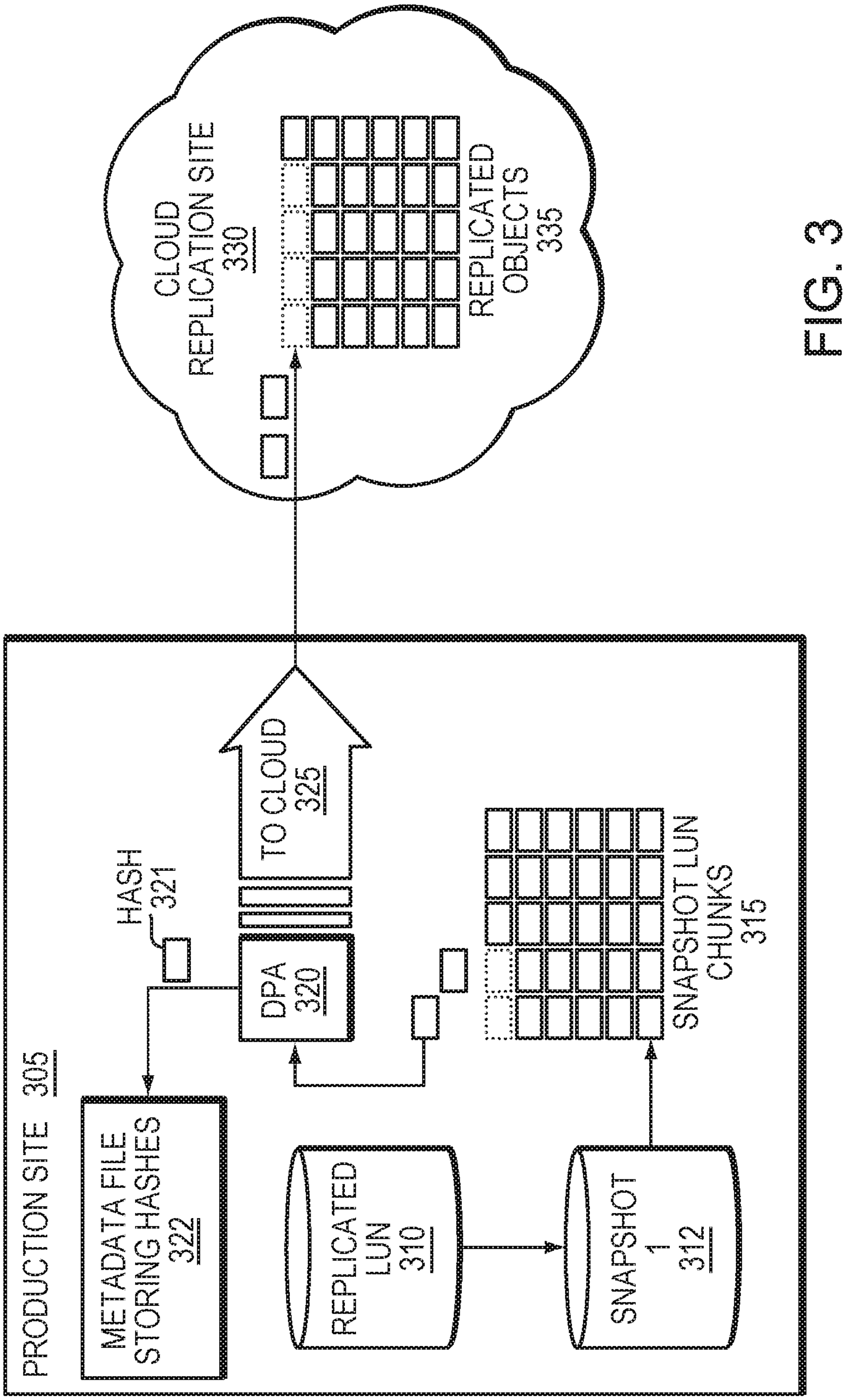
FIG. 3 is a simplified illustration of a data protection system replicating data to a cloud, in accordance with an embodiment of the present disclosure.
Figure 4:
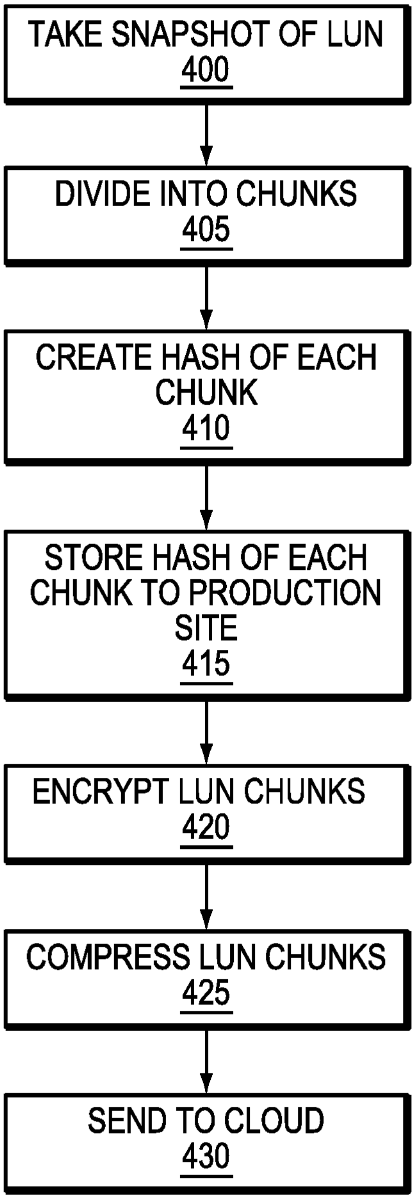
FIG. 4 is a simplified example of a method for replicating a snapshot to a cloud, in accordance with an embodiment of the present disclosure.

Refer now to the simplified example embodiments of FIGS. 3 and 4, which illustrate sending a LUN chunk into a cloud. On production site 305 snapshot 1 312 is taken of replicated LUN 310 (step 400). Snapshot 1 312 is divided into snapshot LUN chunks 315 (step 405). A Hash, such as hash 321, which may be a SHA1 hash, of each snapshot LUN chunk data is created (step 410). The hash of each LUN chunk is stored on production site 305 in local meta data file 322 (step 415). LUN chunks 315 are encrypted by DPA 320 (step 420). LUN chunks 315 are compressed by DPA 320 (step 425). DPA 320 sends encrypted LUN chunks into cloud replication site 330 via communicative coupling 325 (step 430). LUN chunks 315 arrive at cloud replication site 330 and are stored as replicated objects 335.

In certain embodiments, a meta data file containing the list of the chunk objects and the hashes of the data of each chunk may be sent to the replication site at the cloud. In some embodiments, the chunks may be sent using an API for example a REST based API.

Figure 5:
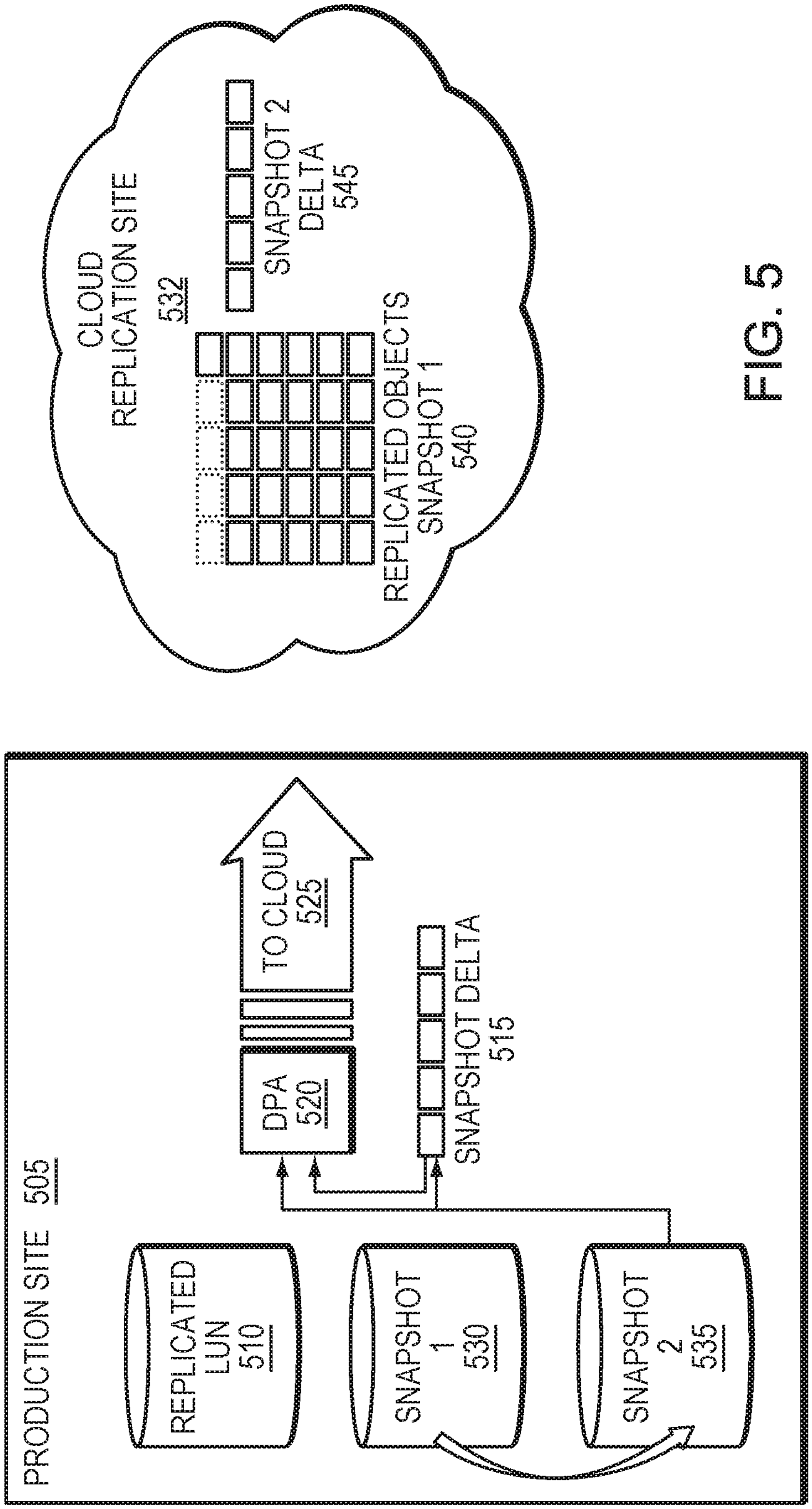
FIG. 5 is a simplified illustration of a data protection system replicating a snapshot differential to a cloud, in accordance with an embodiment of the present disclosure.
Figure 6:
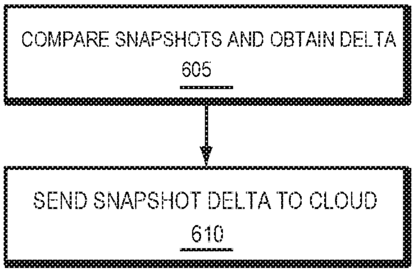
FIG. 6 is a simplified example of a method for replicating a snapshot differential to a cloud, in accordance with an embodiment of the present disclosure.

Refer now to the simplified example embodiments of FIGS. 5 and 6, which illustrate storing a snapshot in the cloud. In these example embodiments, a first snapshot, snapshot 1 530, has been taken of replicated device 510 at a first time. A second snapshot, snapshot 2 535, has been taken at a second time. Snapshot 1 530 has been stored in cloud replication site 532 as replicated objects snapshot 1 540. A comparison is made between snapshot 1 530 and snapshot 2 535 to arrive at snapshot delta 515 (step 605). DPA 520 encrypts snapshot delta 515 and sends it to cloud replication site 532 via communicative coupling 525 (step 610).

In some embodiments, the snapshot delta may be a list of the chunks that had data changed between the first and second snapshot. In certain embodiments, the system may send the changed chunks, a metadata file describing the list of objects that represent the chunks of the new snapshot, and the hash of the value of each chunk. In other embodiments, the changed chunks may be sent as differences from previous chunks, i.e. only the locations changed in the chunk are stored in the cloud. In certain embodiments, to recover a chunk its reference chunk may need to be recovered as well.

Figure 7:
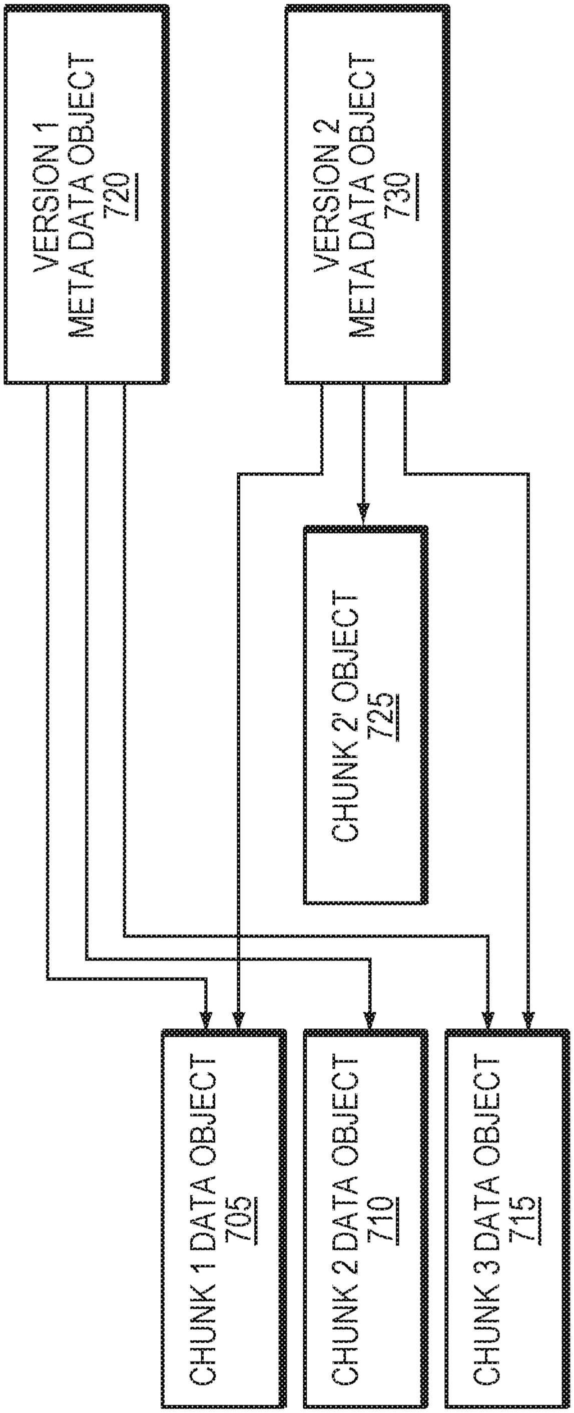
FIG. 7 is a simplified illustration of storing snapshots as a set of objects, in accordance with an embodiment of the present disclosure.

Refer now to the simplified example embodiment of FIG. 7, which illustrates chunk data and metadata about chunks. Chunk 1 data object 705, chunk 2 data object 710, and chunk 3 data object 715 are referenced by version 1 metadata object 720 as referring to a set of data at a particular time or version. Chunk 2' object 725 contains the data for chunk 2 data object 710 at the second point in time. Version 2 metadata object 730 denotes what data corresponds to version 2 or the second point in time. In this embodiment, chunk 1 data object 705 and chunk 3 data object 715 have not changed between versions, and version 2 metadata object 730 refers to the same data as in the first version. In this embodiment, chunk 2 object 710 has changed and version 2 metadata object 730 references chunk 2' object 725.

Figure 8:
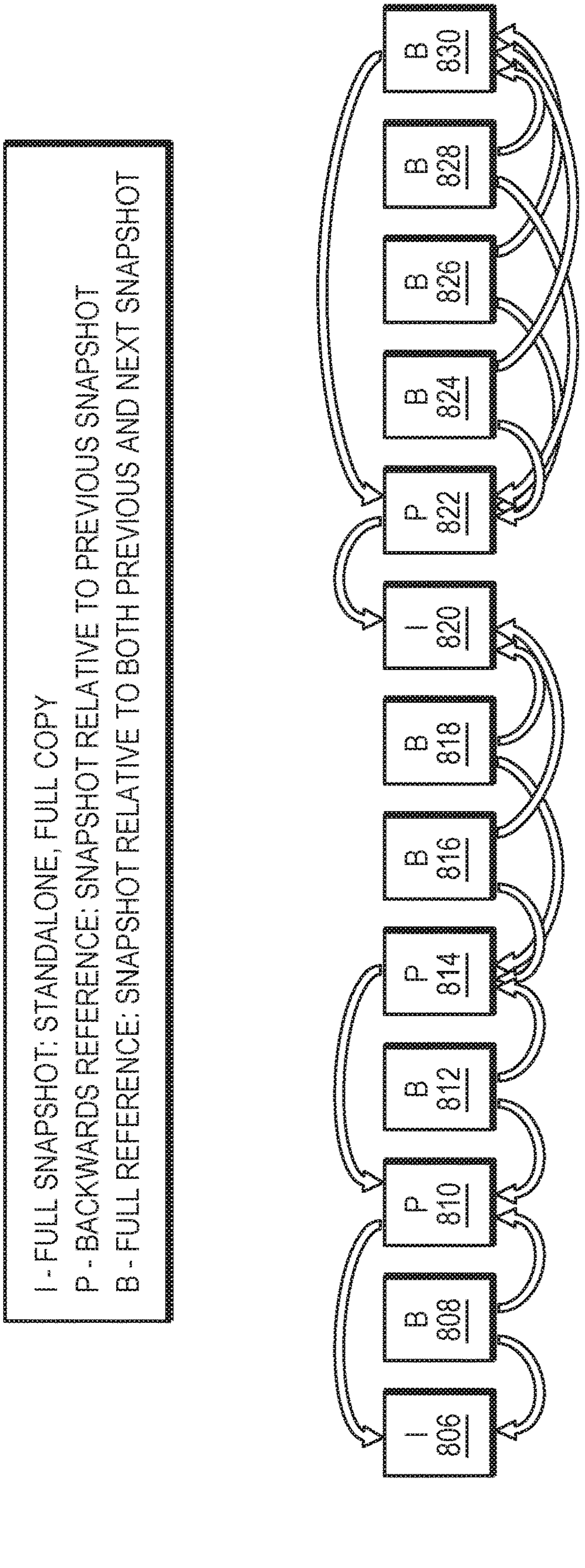
FIG. 8 is a simplified illustration of different types of snapshots, in accordance with an embodiment of the present disclosure.

Refer now to the simplified example embodiment of FIG. 8, which illustrates how snapshots may reference other snapshots. In the example embodiment of FIG. 8, there are three types of snapshots. An I snapshot, such as snapshot 806 and 820, is a full snapshot that contains all the data of the object of the snapshot. A P snapshot, such as snapshots 810, 814, 822, and 830, is a snapshot that references data of a snapshot that occurred at a previous point in time. For example, P snapshot 810 references data in snapshot I 806. This means that all the data common in snapshots 810 and 806 is not duplicated in both snapshots. Rather, the later snapshot, P 810, references back to data stored in snapshot 806. A B snapshot, is a snapshot that is relative to a snapshot both before and after the snapshot was taken. For example, B snapshot 808 refers both backwards in time to snapshot I 806 and forward in time to P snapshot 810. By referring backwards in time or both backwards and forwards in time to other snapshots, less data needs to be stored than if every snapshot were a full snapshot.

In certain embodiments, a P snapshot may be created by, instead of shipping a full chunk if a single block is changed, shipping a list of the blocks that changed from the reference chunk and the new data, which may be compressed and encrypted. In most embodiments, in order to recover a chunk which is in a P snapshot, both the object describing the differences and the object pointed to by the object may need to be referenced. Referring back to the example embodiment of FIG. 8, a chunk in snapshot 810 may need to reference the object describing the chunk as well as the object describing the chunk in snapshot 806. Referring again to FIG. 8, in the case of snapshot 812, which is a B snapshot, both the respective chunks from snapshot 810 and 806 may need to be referenced.

In a first embodiment, a B type snapshot may be created by refining granularity. In this embodiment, an I snapshot (such as snapshot 806) may be sent to the cloud. In this first embodiment, a P snapshot (such as snapshot 810) may be sent to the cloud. In this embodiment, the production site may refine the available point in time and send another bi-directional snapshot, such as snapshot 808 to the cloud.

In a second embodiment a P snapshot may be changed to a B snapshot. In the second embodiment, an I snapshot such as snapshot 806, may be sent to the replica. In this embodiment, a P snapshot, such as snapshot 808, may be sent to the replica. In this embodiment, a P snapshot, such as snapshot 810, may be sent to the replica. In this embodiment, the cloud may reorganize a P snapshot, such as snapshot 808, into a B snapshot and the P version of the snapshot may be erased, thus saving space in the cloud.

In certain embodiments, a B snapshot may include a full pointer to a chunk object in the respective P and I snapshots. In a particular embodiment, take a volume with 3 chunks c1, c2, c3 at time T1. In this embodiment c2 and c3 change at time T2. In this embodiment, the snapshot at T2 (a P snapshot) may include the original chunk c1 and the changed chunks c2 and c3. In this embodiment, the snapshot at T1, a B snapshot may include, c1 and c2 from the original snapshot and c3 from the P snapshot. In certain embodiments, a B snapshot may include a differential chunk if the same chunk changed twice, once before the B snapshot and once after the B snapshots.

| Embodiment A | | |
|---|---|---|
| | T0 | |
| A | B | C |
| | T1 | |
| A | D | C |
| | T2 | |
| A | D | E |

In embodiment A, the B snapshot at T1 includes a list of pointers to T0 and T2 and does not include any data chunks of its own.

| Embodiment B | | |
|---|---|---|
| | T0 | |
| A | B | C |
| | Ti | |
| A | D | E |
| | T2 | |
| A | F | E |

In embodiment B, a B snapshot at T1 will have a pointer to c1 in T2, and c3 in T2, but for c2, the differences between c2 in T1 and c2 in T2 may be compressed.

In certain embodiments, a chunk may be 1 MB or more. In most embodiments, the differences between chunks may yield significant storage and processing efficiencies.

Figure 9:
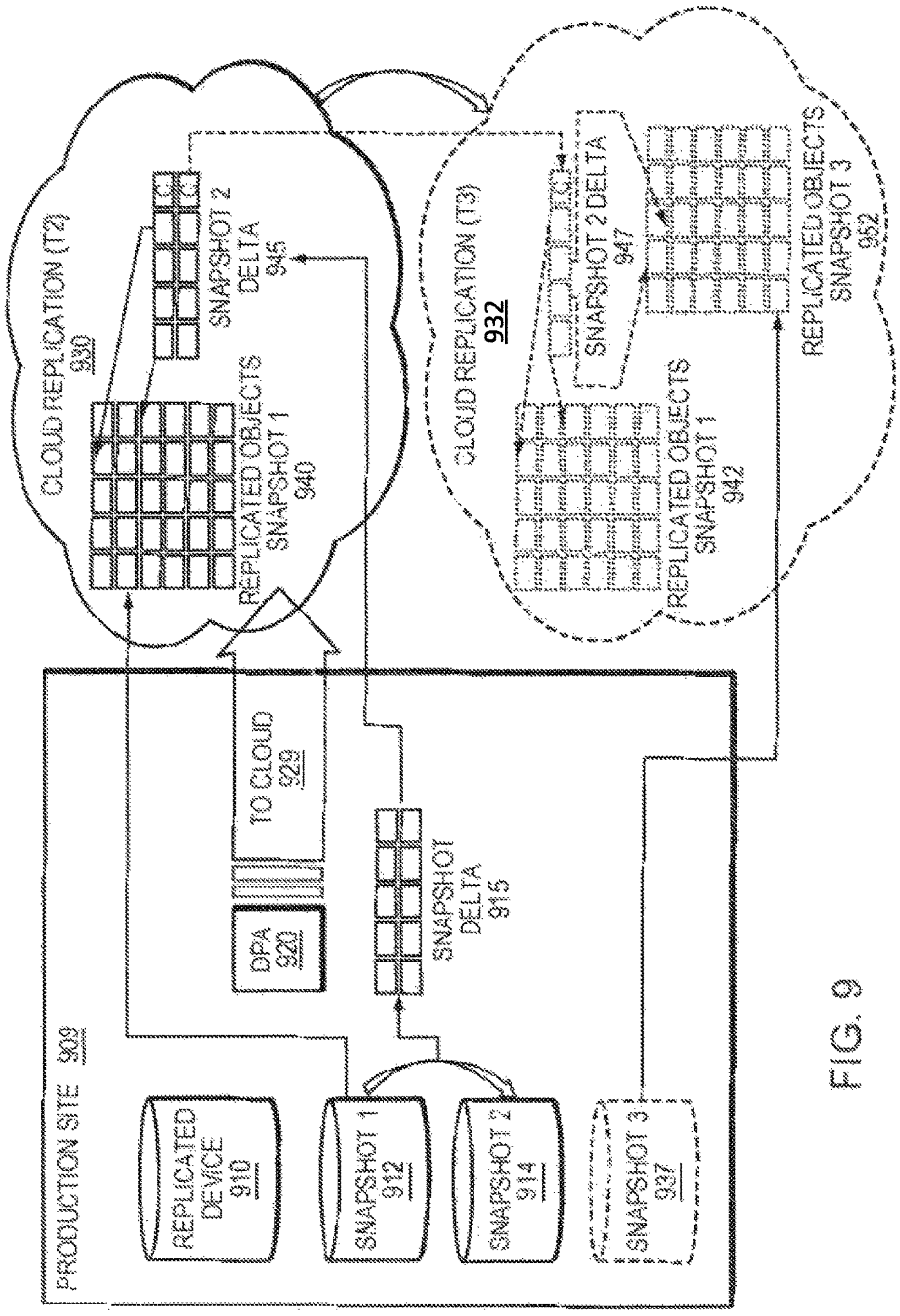
FIG. 9 is an alternative simplified illustration of a data protection system replicating a snapshot differential to a cloud, in accordance with an embodiment of the present disclosure.

Refer now to the example embodiment of FIG. 9 showing a transformation from a P snapshot to a B snapshot. On production site 909 at time T2, there is snapshot 1 912 and snapshot 2 914. At time T2, Snapshot 1 912 has been transferred to cloud replication 930 as replicated objects snapshot 1 940 and snapshot 2 914 has been transferred as Snapshot 2 Delta 945. At time T2 in cloud replication 930, Snapshot 2 Delta 945 is a P snapshot referencing data in replicated objects snapshot 1 940. Cloud replication 932 represents the cloud at future time T3. FIG. 9 also illustrates snapshot delta 915, replicated objects snapshot 1 942, snapshot 2 delta 947, and replicated objects snapshot 3 952.

Figure 10:
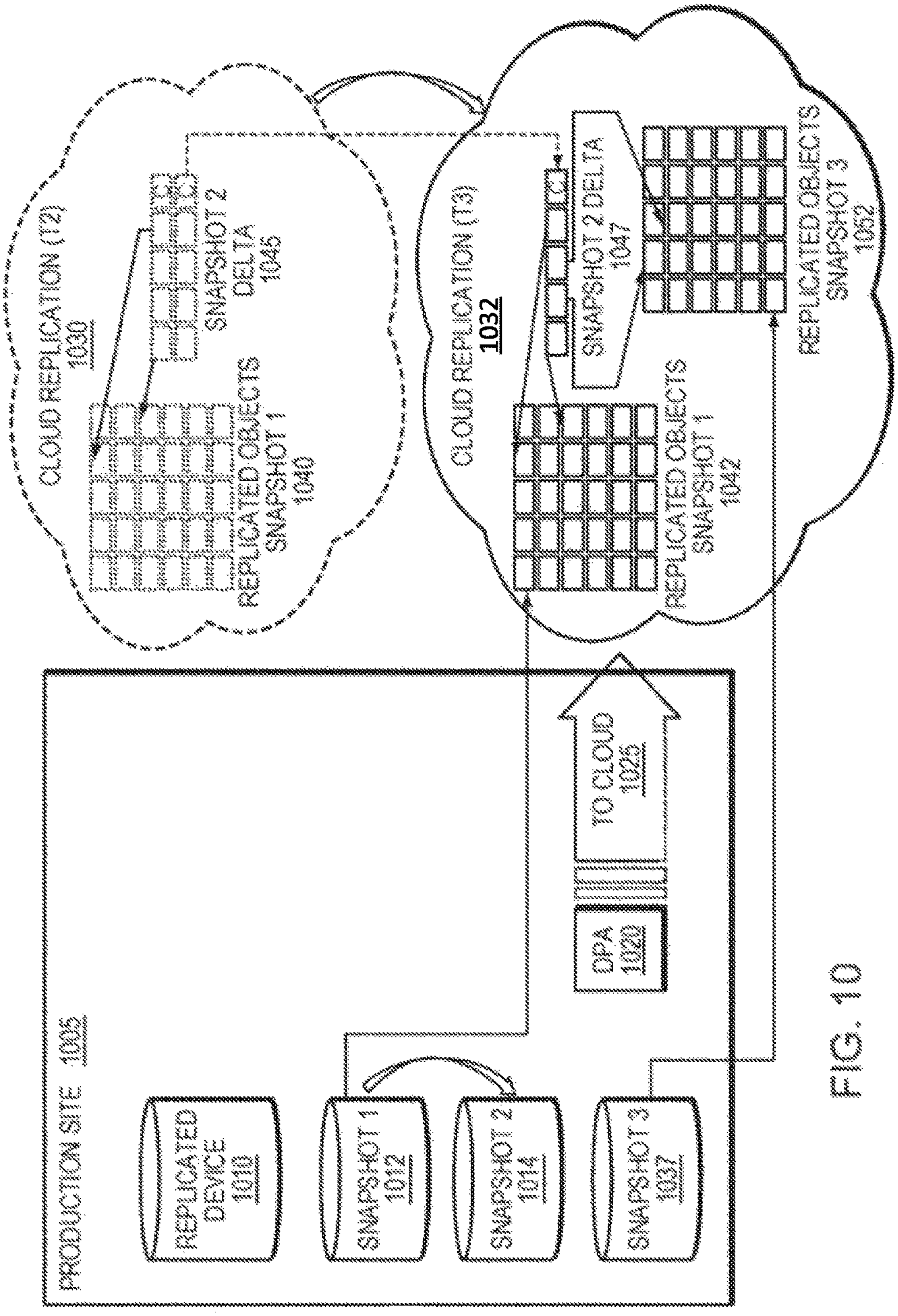
FIG. 10 is a simplified illustration of a data protection system replicating updating a snapshot differential, in accordance with an embodiment of the present disclosure.

Refer now to the example embodiment of FIG. 10. Production site 1005 has replicated device 1010, snapshot 1 1012, snapshot 2 1014, snapshot 3 1037 and DPA 1020. In this example embodiment, at time T3, snapshot 3 1037 has been created and sent to cloud replication 1032. Replicated objects snapshot 3 1052 represents a full snapshot. Snapshot 2 delta 1047 is adjusted to point to data on replicated objects snapshot 3 1052. By doing this, snapshot 2 delta 1047 is able to have a smaller footprint and reduce the amount of storage necessary on cloud replication 1032. FIG. 10 also illustrates cloud replication cloud replication (T2) 1030, replicated objects snapshot 1 1040, snapshot 2 Delta 1045, and replicated objects snapshot 1 1042.

Figure 11:
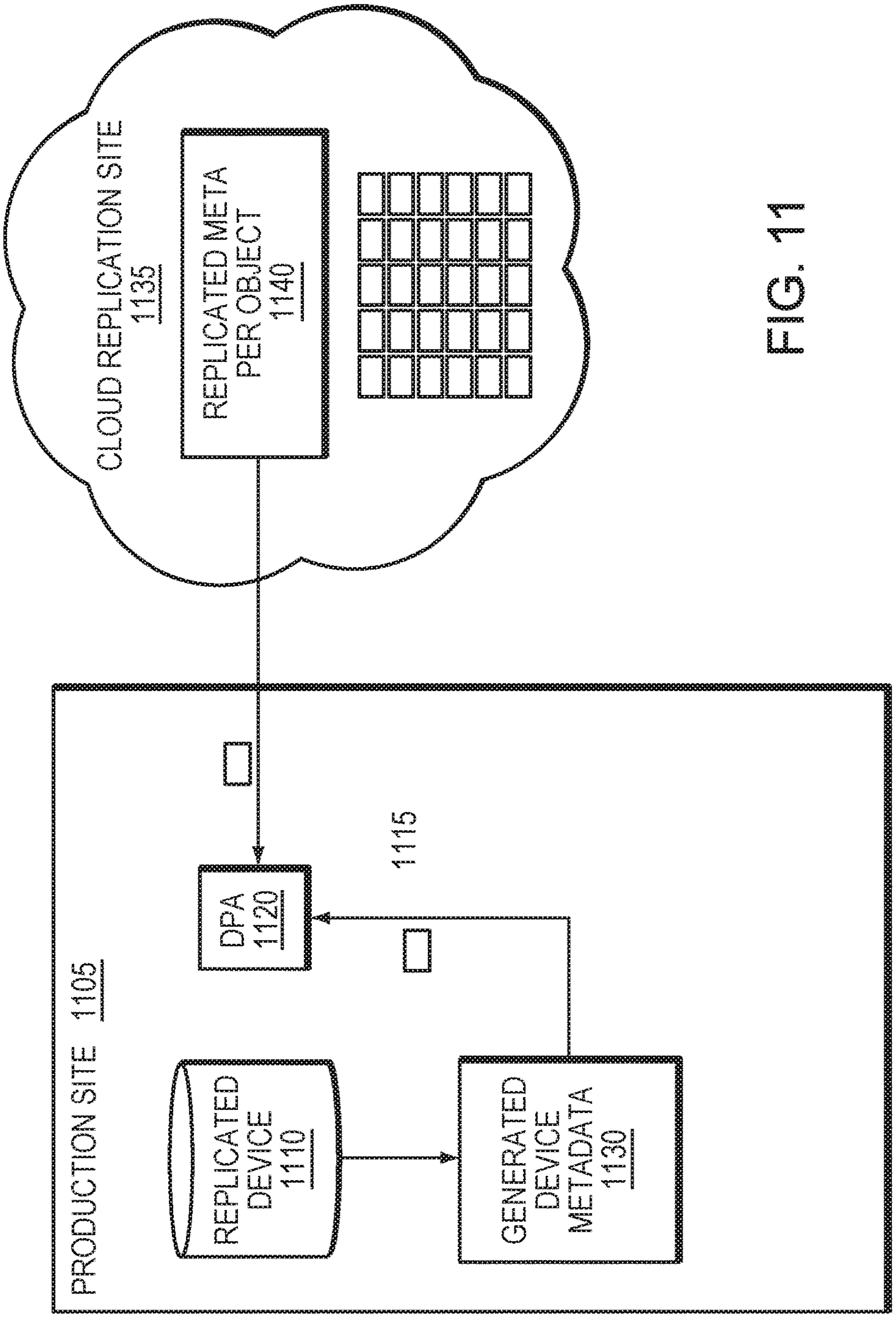
FIG. 11 is a simplified illustration of a data protection system validating on the production site based on data from a cloud, in accordance with an embodiment of the present disclosure.
Figure 12:
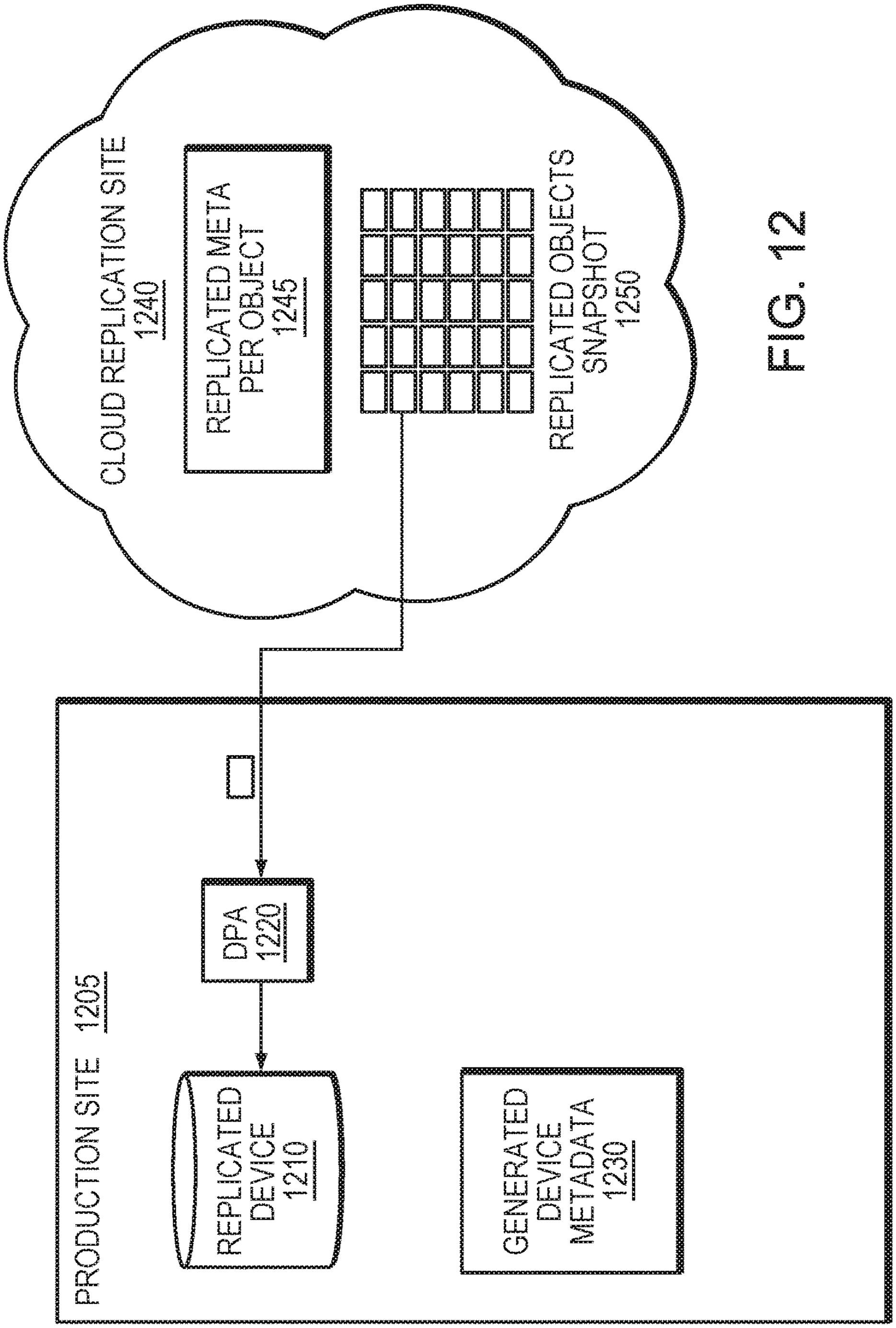
FIG. 12 is a simplified illustration of a data protection system restoring on the production site based on data from a cloud, in accordance with an embodiment of the present disclosure.
Figure 13:
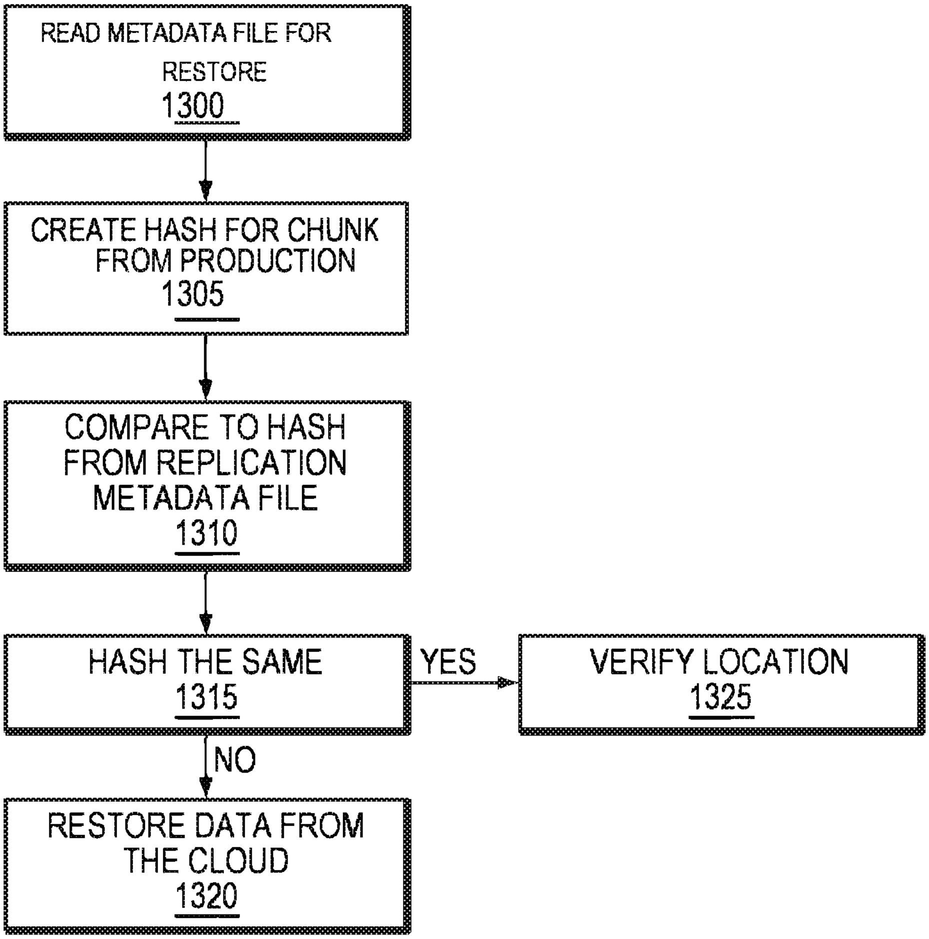
FIG. 13 is a simplified example of a method for validating production data from a cloud, in accordance with an embodiment of the present disclosure.

Refer now to the example embodiments of FIGS. 11, 12, and 13, which illustrate recovery from a failure on the production site. Device 1110 has become corrupted and a user may want to restore the device to an earlier point in time stored at the cloud. In this embodiment, all blocks in device 1110 may not be corrupted, so it may be desired to restore the blocks which are corrupt. DPA 1120 reads metadata file 1130 for point in time to be restored from the cloud, the metadata file includes the list of chunks and for each chunk the hash value of the data of the chunk (step 1300). DPA 1120 initiates a background process which starts restoring and/or verifying the chunks. For each chunk the chunk data is read from the production storage and the hash is calculated (step 1305). DPA 1120 compares the hash or metadata from device 1110 and cloud 1135 (step 1310). If the hash or metadata is the same (determined at step 1315), the storage location on device 1110 that is storing the chunk from which the hash was calculated is verified as consistent (step 1325). If the hash or metadata is not the same (determined at step 1315), the data is restored from cloud 1240 (step 1320). In this way, each location on device 1110 is deemed "validated" and device 1110 is deemed "validated." In the case data is restored from cloud 1230, DPA 1220 gets data from replicated objects snapshot 1250. DPA 1220 sends the data to replicated device 1210.

In some embodiments, the restore process may occur when a user is accessing the LU. In certain embodiments if the user is accessing the LUN during a restore, a splitter may redirect all reads and writes to the DPA. In some of embodiments, when a read or a write arrives at the DPA, the DPA may check if the chunk was already verified. In certain of these embodiments if the chunk is not yet verified, the system may verify the chunks and notify the splitter to process with the read or the write 10. In some other embodiments, if the chunk has been verified, the splitter may be notified to proceed with the IO.

Figure 14:
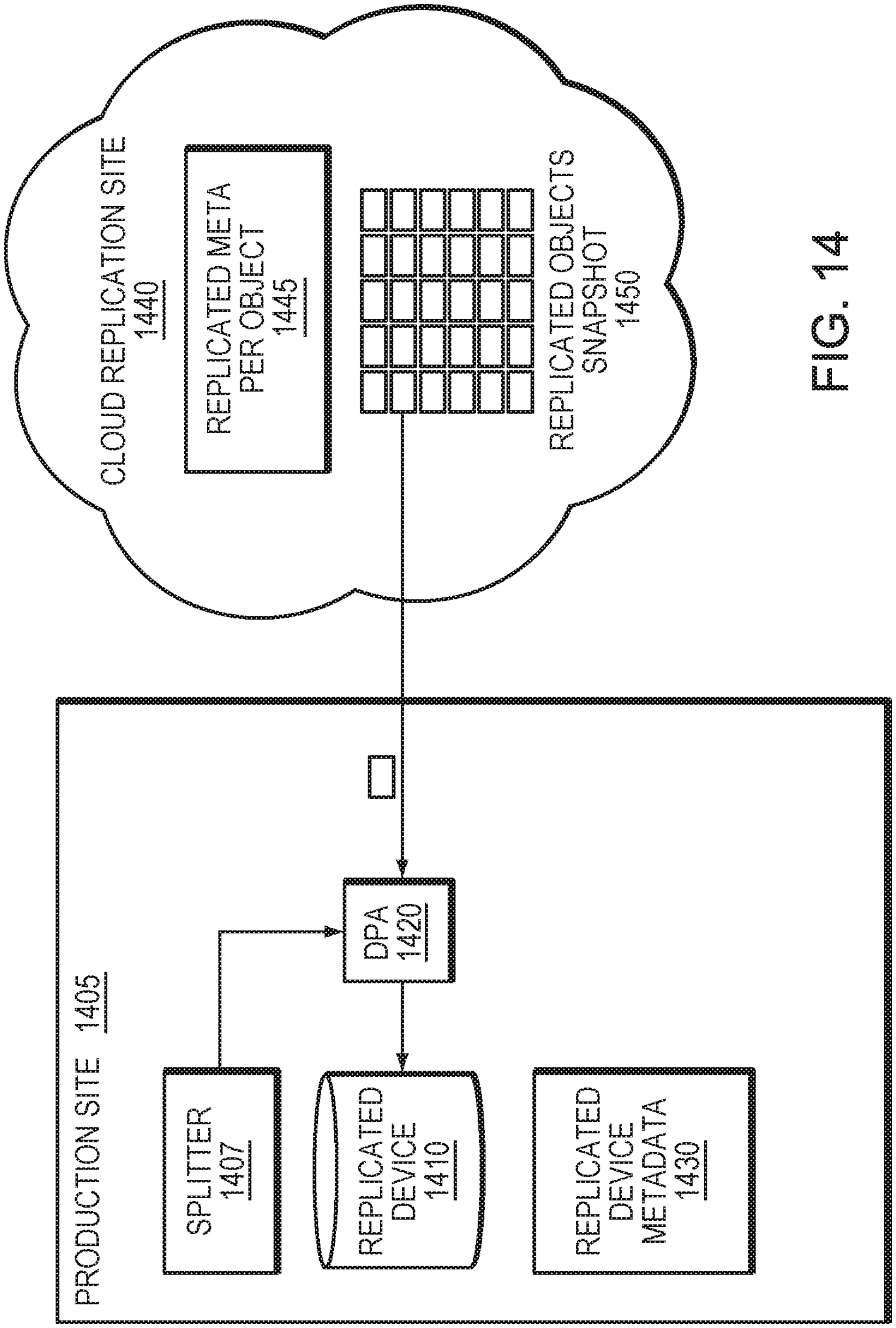
FIG. 14 is a simplified illustration of enabling instant access to data protection system while validating data on the production site based on data from a cloud, in accordance with an embodiment of the present disclosure.
Figure 15:
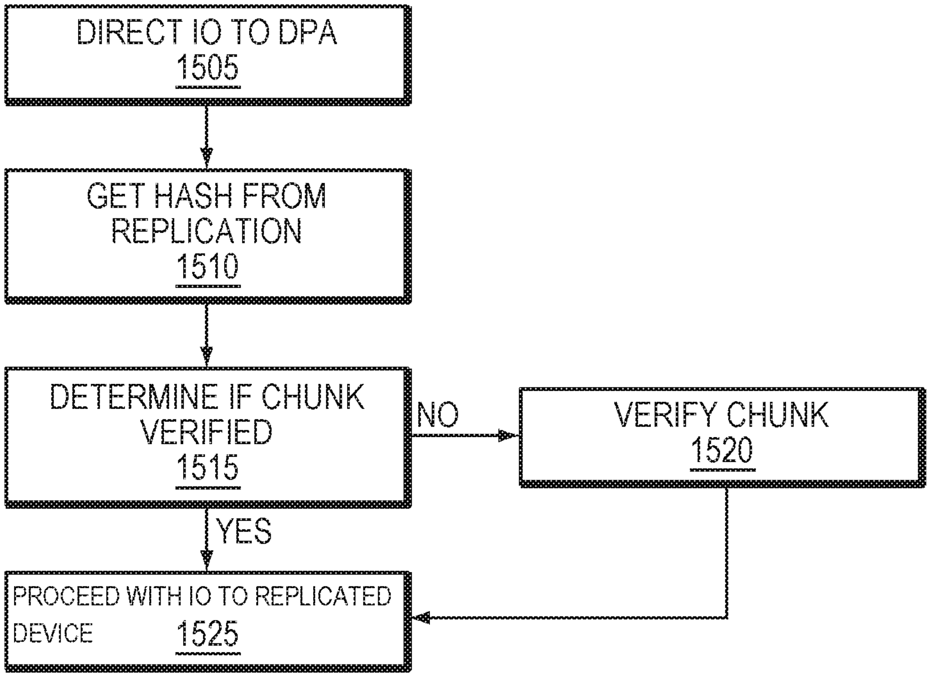
FIG. 15 is a simplified example of a method for enabling instant access to production data using data from a cloud, in accordance with an embodiment of the present disclosure.

Refer now to the example embodiments of FIGS. 14 and 15, which illustrate read write access to a replicated device being restored by the cloud. Splitter 1407 directs IO to DPA 1420 (step 1505). A hash corresponding to the target of the IO is gotten (step 1510). A determination is made if the target chunk for the IO has been verified (step 1515). If the target chunk has not been verified, it is verified (step 1520) and the data is read from cloud 1440. If the chunk has been verified, the IO proceeds to replicated device 1410 (step 1525). In certain embodiments, once all chunks have been verified, the LUN is considered validated, and may be moved to normal operation, and IOs may no longer be intercepted by the splitter.

Figure 16:
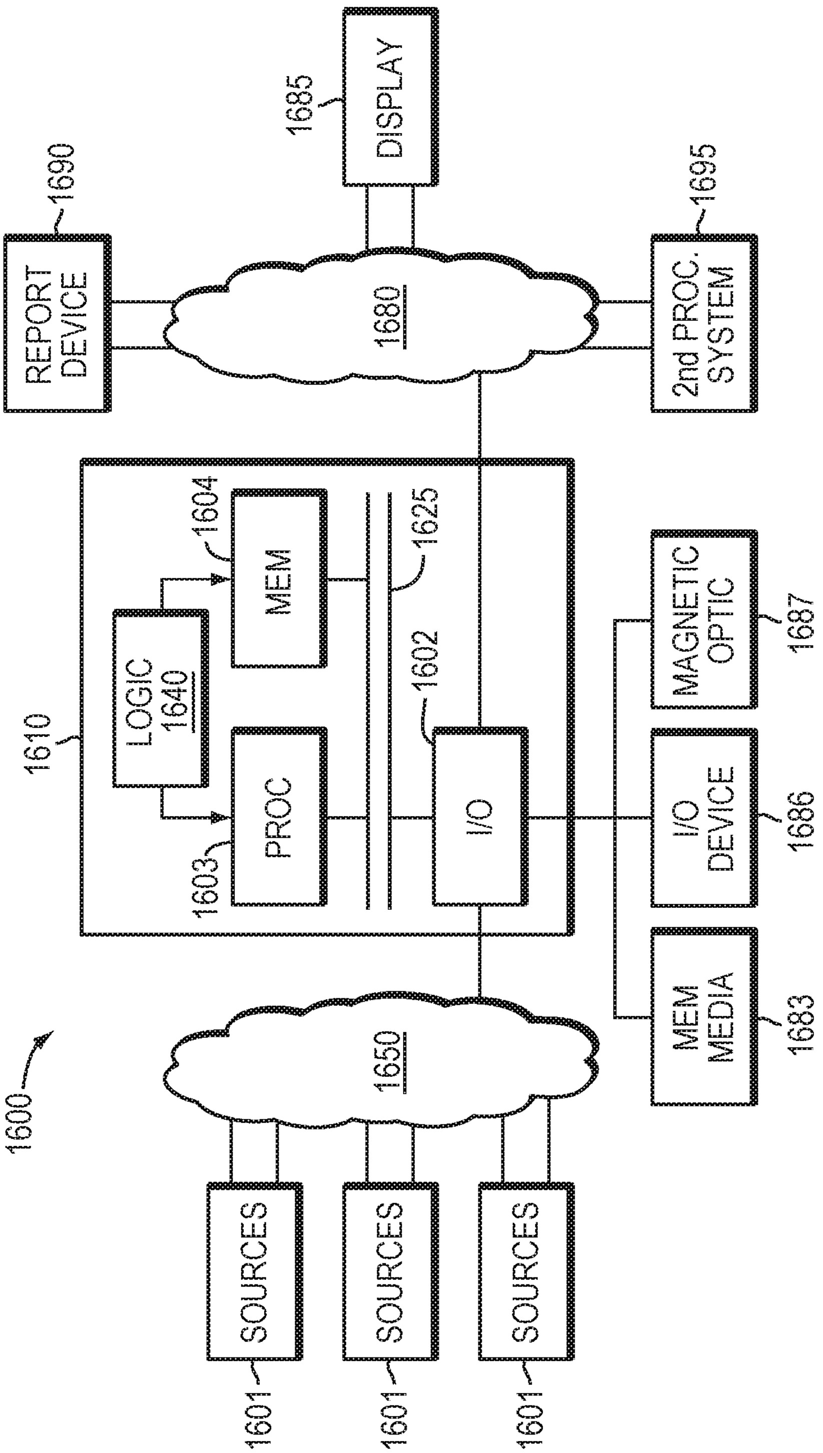
FIG. 16 is an example of an embodiment of a machine or computer that may utilize the techniques described herein, in accordance with an embodiment of the present disclosure.
Figure 17:
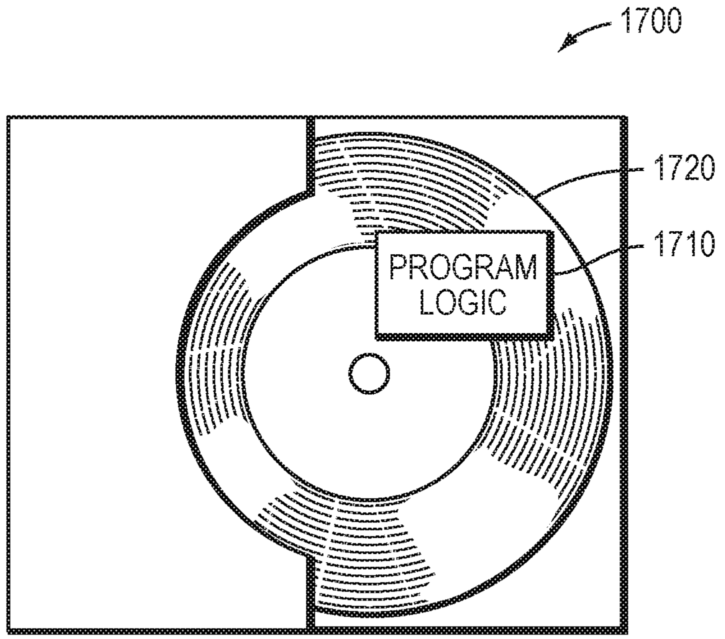
FIG. 17 is an example of an embodiment of a computer readable storage medium embodying a method that may utilize the techniques described herein in accordance with an embodiment of the present disclosure.

The methods and apparatus of this invention may take the form, at least partially, of program code (i.e., instructions) embodied in tangible media, such as floppy diskettes, compact disk, read only memories (CD-ROMs), hard drives, random access or read only-memory, or any other machine-readable storage medium. When the program code is loaded into and executed by a machine, such as the computer of FIG. 16, the machine becomes an apparatus for practicing the invention. When implemented on one or more general-purpose processors, the program code combines with such a processor 1603 to provide a unique apparatus that operates analogously to specific logic circuits. As such a general purpose digital machine can be transformed into a special purpose digital machine. FIG. 17 shows Program Logic 1710 embodied on a computer-readable medium 1720 as shown, and wherein the Logic is encoded in computer-executable code configured for carrying out the reservation service process of this invention and thereby forming a Computer Program Product 1700. The logic 1710 may be the same logic 1640 on memory 1604 loaded on processor 1603. The program logic may also be embodied in software modules, as modules, or as hardware modules. FIG. 16 also illustrates sources 1601, interconnects 1650 and 1680, memory media 1683, I/O device 1686, magnetic optic 1687, $2^{nd}$ proc. System 1695, display 1685, I/O 1602, interconnects 1625, and report device 1690. 1610 represents a logical grouping of processor 1603, memory 1604, I/O 1602, and interconnect 1625. 1600 represents the computer of FIG. 16.

The logic for carrying out the method may be embodied as part of the system described herein, which is useful for carrying out a method described with reference to embodiments shown in, for example, FIGS. 4 and 6. For purposes of illustrating the present invention, the invention is described as embodied in a specific configuration and using special logical arrangements, but one skilled in the art will appreciate that the device is not limited to the specific configuration but rather only by the claims included with this specification.

Although the foregoing invention has been described in some detail for purposes of clarity of understanding, it will be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

What is claimed is:

1. A system comprising:

a production site including a LUN;

a cloud having storage, wherein the cloud stores a plurality of chunks and a plurality of hashes, wherein each chunk corresponds to a portion of the LUN at a point in time, and wherein each hash of the plurality of hashes corresponds to a chunk;

one or more processors; and memory storing computer-executable program logic, wherein the computer-executable program logic is configured to cause execution, by the one or more processors, of:

downloading the plurality of hashes from the cloud;

determining a second plurality of hashes for the LUN on the production site, wherein each hash of the second plurality of hashes corresponds to a value for a portion of the LUN;

comparing each of the second plurality of hashes for the LUN with each of the plurality of hashes downloaded from the cloud to determine if the compared hashes match:

downloading data, corresponding to one or more non-matching non-corresponding hashes, from the cloud, wherein the data corresponds to one or more chunks corresponding to the one or more non-matching hashes; and restoring the data that was downloaded to the LUN on the production site.

2. The system of claim 1 wherein the computer-executable program logic is further configured to cause execution, by the one or more processors, of:

providing instant access to the LUN regardless of whether or not the LUN has been validated; and if a portion of the LUN is accessed, in an access request that has not been validated, validating the LUN in response to the access request.

3. The system of claim 2 wherein the computer-executable program logic is further configured to cause execution, by the one or more processors, of:

validating the LUN, via a background process, while access to the LUN is enabled.

4. The system of claim 1 wherein downloading the data corresponding to the one or more non-matching hashes includes:

downloading the one or more chunks corresponding to the one or more non-matching hashes from the cloud;

uncompressing the one or more chunks; and unencrypting the one or more chunks.

5. A computer implemented method, the method comprising:

executing computer-executable program logic by one or more processors on a computer having memory storing the computer-executable program logic, to implement the steps of:

downloading a plurality of hashes from a cloud corresponding to a set of backed up hashes for a set of chunks, wherein each chunk of the set of chunks is stored in the cloud and corresponds to a portion of a LUN at a production site at a point in time;

determining a second plurality of hashes for the LUN on the production site; and comparing each of the second plurality of hashes for the LUN with each of the plurality of hashes downloaded from the cloud to determine if the compared hashes match;

downloading data, corresponding to one or more non-matching hashes, from the cloud, wherein the data corresponds to one or more chunks corresponding to the one or more non-matching hashes; and restoring the data that was downloaded to the LUN on the production site.

6. The method of claim 5 further comprising:

providing instant access to the LUN regardless of whether or not the LUN has been validated; and if a portion of the LUN is accessed, in an access request that has not been validated, validating the LUN in response to the access request.

7. The method of claim 6 further comprising:

validating the LUN, via a background process, while access to the LUN is enabled.

8. The method of claim 7 wherein if an Input/Output (IO) is directed to a location that has been validated, where a location that has been validated is a location on a LUN for which a hash has been compared to a hash downloaded from the cloud for the location and found to match, the IO directed to the validated location is allowed to process.

9. The method of claim 5 wherein downloading the data corresponding to the one or more non-matching hashes includes:

downloading the one or more chunks corresponding to the one or more non-matching hashes from the cloud;

uncompressing the one or more chunks; and unencrypting the one or more chunks.

10. The method of claim 9 wherein Input/Outputs (IOs) to the LUN are intercepted by a splitter.

11. The method of claim 10 wherein once the LUN has been validated, the splitter stops intercepting IOs.

12. A computer program product comprising:

a non-transitory computer readable medium encoded with computer executable program code, the code is configured to cause execution, by one or more processors, of:

downloading a plurality of hashes from a cloud corresponding to a set of backed up hashes for a set of chunks, wherein each chunk of the set of chunks is stored in the cloud and corresponds to a portion of a LUN at a production site at a point in time;

determining a second plurality of hashes for the LUN on the production site;

comparing each of the second plurality of hashes for the LUN with each of the plurality of hashes downloaded from the cloud;

if corresponding hashes do not match:

downloading data corresponding to one or more non-matching hashes from the cloud; wherein the data corresponds to one or more chunks corresponding to the one or more non-matching hashes; and restoring the data to the LUN on the production site.

13. The computer program product of claim 12 wherein downloading the data corresponding to the one or more non-matching hashes includes:

downloading the one or more chunks corresponding to the one or more non-matching hashes from the cloud;

uncompressing the one or more chunks; and unencrypting the one or more chunks.

14. The computer program product of claim 12 wherein the computer-executable program code further is configured to cause execution, by the one or more processors, of:

providing instant access to the LUN regardless of whether or not the LUN has been validated; and if a portion of the LUN is accessed, in an access request that has not been validated, validating the LUN in response to the access request.

15. The computer program product of claim 14 wherein the computer executable program code further is configured to cause execution, by the one or more processors, of:

validating the LUN, via a background process, while access to the LUN is enabled.

16. The computer program product of claim 14 wherein Input/Outputs (IOs) to the LUN are intercepted by a splitter.

17. The computer program product of claim 16 wherein if an Input/Output (IO) is directed to a location that has been validated, where a location that has been validated is a location on a LUN for which a hash has been compared to a hash downloaded from the cloud for the location and found to match, the computer-executable program code further is configured to cause execution, by the one or more processors of:

allowing the IO directed to the validated location to process.

18. The computer program product of claim 16 wherein once the LUN has been validated, the splitter stops intercepting IOs.

* * * * *